(12) United States Patent
Stanton

(10) Patent No.: US 6,196,699 B1
(45) Date of Patent: Mar. 6, 2001

(54) DUAL LAMP ILLUMINATION SYSTEM AND PROJECTION SYSTEM INCORPORATING SAME

(75) Inventor: Douglas A. Stanton, Ossining, NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/282,324

(22) Filed: Mar. 31, 1999

(51) Int. Cl.[7] .................................................... F21V 7/00
(52) U.S. Cl. ..................... 362/235; 362/247; 362/301; 362/298; 362/346
(58) Field of Search ................................. 362/235, 247, 362/298, 300, 301, 346, 297; 353/31, 33, 94, 98, 99

(56) References Cited

U.S. PATENT DOCUMENTS

| | | | |
|---|---|---|---|
| 1,728,558 | * | 9/1929 | Gilson ................................. 362/298 |
| 2,497,676 | * | 2/1950 | Lashells .............................. 362/298 |
| 3,779,636 | | 12/1973 | Peterson ................................ 353/83 |
| 4,394,717 | * | 7/1983 | Brockwell ............................ 362/247 |
| 4,616,296 | * | 10/1986 | Westgaard et al. ................... 362/301 |
| 5,300,966 | * | 4/1994 | Uehira et al. ............................ 353/30 |
| 5,382,790 | | 1/1995 | Robillard et al. ..................... 250/216 |
| 5,765,934 | * | 6/1998 | Okamori et al. ........................ 353/99 |
| 6,018,214 | * | 1/2000 | De Vaan ............................... 362/247 |

FOREIGN PATENT DOCUMENTS

| | | |
|---|---|---|
| 0519774 A1 | 12/1992 | (EP) . |
| 0552725 A1 | 7/1993 | (EP) . |
| 6242397 | 9/1994 | (JP) . |

* cited by examiner

Primary Examiner—Thomas M. Sember
(74) Attorney, Agent, or Firm—F. Brice Faller

(57) ABSTRACT

A dual lamp illumination system, in which the output beams of two lamps with collimating reflectors are directed into one another to produce a combined beam, and in which plane mirrors set at 90 degrees to one another are inserted half way into the combined beam. Thus half of the combined beam is directed out of the path of the combined beam to form a new combined beam having substantially the same etendue as the original combined beam. The the light rays in the unreflected half of the original combined beam are recycled until they strike one of the plane surfaces, and are thence reflected out into the new combined beam.

20 Claims, 3 Drawing Sheets

DUAL LAMP ILLUMINATION SYSTEM AND PROJECTION SYSTEM INCORPORATING SAME

BACKGROUND OF THE INVENTION

This invention relates to an illumination system, and more particularly relates to a collimated-light illumination system suitable for use in color projection display systems employing one or more electro-optic light modulators.

Most color projection display systems employing one or more electro-optic light modulators, also employ a single-lamp white light illumination source, a first se of dichroic filters arranged to separate the white light from the source into primary (red, blue and green) color components, and a second set of dichroic filters to recombine the components after modulation.

The light modulators usually are active matrix liquid crystal display panels, either transmissive or reflective, and the light source is a high intensity discharge lamp with a small arc length. This small arc length results in a relatively compact illumination beam having a low etendue. Etendue is a term used in optics to define the geometrical limits of an illumination beam, in terms of both area and angular extent. The low etendue of the illumination beam enables the display panel to utilize a large portion of the beam despite the relatively small panel size (approximately 1.3 inches or less).

Considerable effort has been made to further reduce the size, and consequently the cost, of these complex display panels. As the size of such panels are reduced, the arc length of the lamp must also be reduced, in order to reduce the etendue of the illumination beam, thereby maintaining an adequate lumen output of the projection system.

Unfortunately, as arc length is reduced in size, the current density in the lamp electrodes increases until a practical limit is reached. Unfortunately, at the present state of the art of lamp technology, this practical limit dictates arc lengths which result in projected images of marginal brightness.

In the published abstract 6-242397 of Japanese Patent Application No. 5-29320, there is shown a projection display device having two light sources 20 and 21, whose respective illumination beams are condensed on opposed reflection surfaces 27 and 28 by condensing reflectors 31 and 32. The beams are thence reflected by surfaces 27 and 28 into a condensing lens system 33.

Due to the proximity of the reflection surfaces to each other and to the object point of the condensing lens system 33, the respective illumination beams are said to be made incident on lens system 33 in a state of superposition. However, due to the fact that the points of reflection of the two beams from the reflection surfaces are separated from one another, the state of superposition is not perfect, and the etendue of the superposed beams is increased.

Moreover, the need to locate the reflecting surfaces close to the object point of the condensing lens severely restricts the design freedom of such a system.

OBJECTS AND SUMMARY OF THE INVENTION

Accordingly, it is an object of the invention to provide a dual lamp illumination system which overcomes the disadvantages of the prior art.

It is another object of the invention to provide a dual lamp illumination system which does not increase the etendue of the illumination beam.

It is another object of the invention to provide a projection display system incorporating such a dual lamp illumination system.

In accordance with the invention, there is provided a dual lamp illumination system in which two lamps having collimating reflectors are arranged so that their beams overlap to form a first composite beam along at least a portion of an optical path. A pair of plane mirrors are then moved into the path of the composite beam in order to reflect part (eg., one half) of the composite beam out of the beam path. The mirror surfaces are angled so that a new composite collimated beam is formed.

The light rays in the portion of the composite beam which are not reflected into the path of the new composite beam then cycle between the lamp reflectors until they pass into the portion of the composite beam which is in the path of the plane mirror surfaces, whence they are reflected out into the new composite beam.

Such a dual lamp illumination system has the advantage that light output is almost doubled, while the collimation of the original combined beams is substantially maintained. Thus, the lumen output of a projection display system employing such an illumination system can be substantially increased over one with a single lamp, without the need for costly collimating lenses.

In the case in which one half of the first composite beam is reflected, there is substantially no or very little increase in the cross-sectional area of the new composite beam. Since the collimation is also substantially maintained, there is also substantially no or very little increase in the etendue of the beam.

In accordance with a preferred embodiment of the invention, further increases in lumen output are obtainable by moving the mirrors to reflect slightly more than one half of the first composite beam. For example, moving the mirrors further into the beam by an amount of up to 4 times (eg., ½ to 2 times) the diameter of the light source result in an increase in lumen output of as much as 20 to 30 percent. However, the cross-sectional area of the beam increases, thus decreasing etendue. Adjusting the position of the mirrors within the above range can enable the realization of an optimum trade-off between increased lumen output and reduced etendue for a particular projection system.

In accordance with another feature of the invention, the plane mirror surfaces can be rotatable about an axis corresponding to the proximal edges (or common edge) of the plane mirror surfaces, enabling directing or ▓steering▓ of the new composite beam in any desired direction within the angle of rotation, without divergence and with only a moderate increase in cross-sectional area, and thus a moderate increase in etendue.

As an alternative to operating the lamps in the illumination system of the invention at or near full power in order to obtain increased lumen output of the system, the lamps could be operated at reduced power in order to increase the operating life of the lamps. Such reduced-power operation also enables continued operation in the event of the failure of one of the lamps, by simply operating the remaining lamp at full power. If desired, the plane mirror surfaces can be moved further into the beam path to reflect the entire beam from the operating lamps.

Preferably, the lamps are of substantially identical type and size, and are arranged facing each other. Alternatively, the optical paths of the lamps can be folded using one or more mirrors. Preferably, the plane mirror surfaces employed to reflect the lamps' composite beam are formed on two adjacent sides of a cube or half cube.

In accordance with the broad aspects of the invention, the dual lamp illumination system comprises:

a first lamp and a second lamp, each lamp comprising a light source and a collimating reflector for forming a collimated illumination beam, the lamps being positioned with respect to one another so that the beam of the first lamp is directed into the reflector of the second lamp, and the beam of the second lamp is directed into the reflector of the first lamp, in a manner so that the beams at least partially overlap to form a first composite beam;

first and second plane mirror surfaces oriented adjacent to one another and positioned so as to each reflect a portion of the first composite beam in a different but common direction along a common axis, to form a second composite beam.

In accordance with another aspect of the invention, there is provided a projection display system comprising at least one light modulating display panel, an illumination system for illuminating the display panel, and a projection lens for projecting the modulated light onto a display surface, characterized in that the illumination system comprises the dual lamp illumination system of this invention.

BRIEF DESCRIPTION OF THE DRAWINGS

The invention will be described in terms of a limited number of embodiments, with reference to the drawing figures, in which.

DESCRIPTION OF THE PREFERRED EMBODIMENTS

Figure 1B:
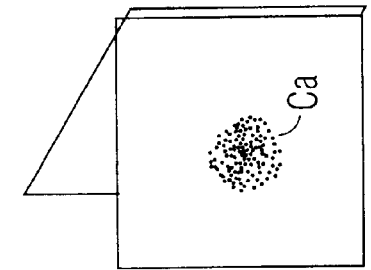
FIG. 1B is a schematic representation of the cross-section of the composite output beam of the layout of FIG. 1A.
Figure 1A:
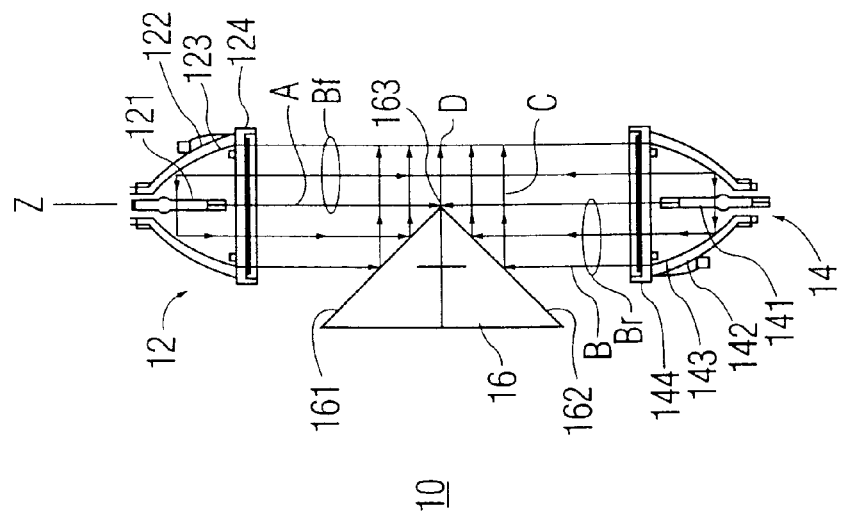
FIG. 1A is a schematic layout of one embodiment of a dual lamp illumination system in accordance with the invention.

FIG. 1A, a schematic layout of one embodiment of a dual lamp illumination system 10 of the invention, in which lamps 12 and 14 are of the same type and size, each having a light source (121, 141) a housing (122, 142) having an interior reflective surface (123, 143), and a cover plate (124, 144). The lamps are positioned to face one another, with their axis of symmetry Z corresponding with the axis of the beam path A, so that their illumination beams cycle back and forth between the lamps, to produce a composite beam B. This cycling takes place because the reflective surfaces (123, 143) of the housings (122, 142) have a shape (eg., parabolic) to produce a collimated output beam. Thus, these reflectors return incoming light rays along parallel paths The lamps may be any of a variety known to be useful for illumination in general, or for projection systems in particular, such as arc lamps, also known as high intensity discharge (HID) lamps, including metal-halide and xenon lamps, as well as tungsten-halogen lamps. The lamps shown are HID metal-halide lamps of the same size and type, however, the lamps need not be of the same size, or even the same type, provided that the etendue of the combined beam B is no greater than that of the largest individual beam.

The output beam C is obtained by inserting an optical element 16 partially into the path of the combined beam B. This optical element 16 is a half cube having plane mirror surfaces 161 and 162, and a common edge or apex 163. The apex 163 is located at the center of the combined beam path or axis A. The reflecting surfaces are oriented at an angle of 90 degrees to one another, and 45 degrees to the path of the light rays, which are parallel to one another due to the collimating reflective surfaces (122, 143). One result of this arrangement is that the light rays in one half of the combined beam B (designated Br) strike the reflecting plane surfaces 161 and 162, and are reflected in the same direction parallel to axis D to form a new combined bean C. As will be appreciated, the cross-sectional area Ca (see FIG. 1B) of the combined beam C is no larger than that of combined beam B.

Another result of the above arrangement is that the light rays in the other half of the combined beam B (designated Bf) cycle back and forth between the reflective surfaces 123 and 143 until they exit from one or the other of the lamps on the first side Br. Thus, essentially all of the light from the two lamps eventually enters the combined beam C.

Figure 2:
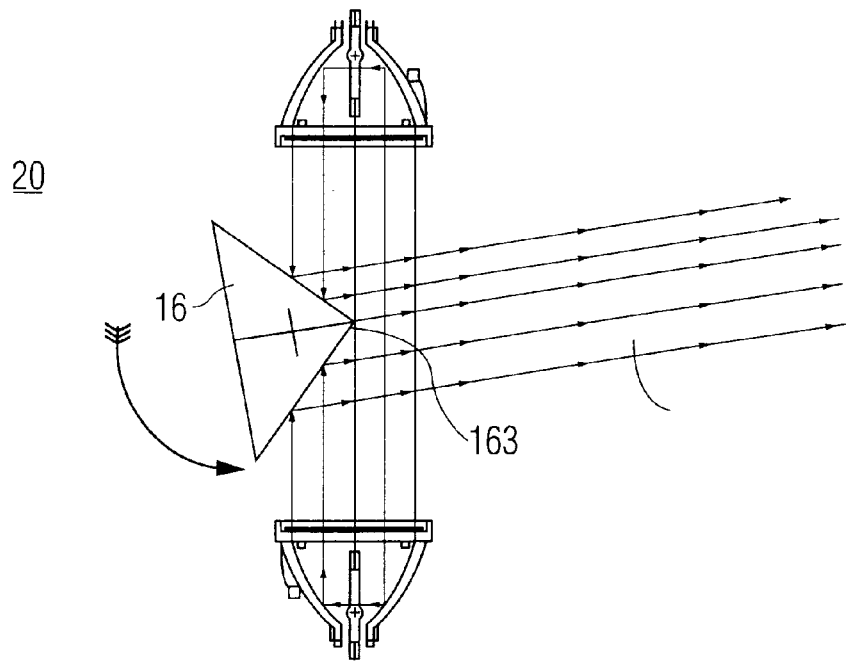
FIG. 2 is a schematic layout similar to that of FIG. 1A, illustrating the feature of directability of the output beam.

FIG. 2 shows a variation 20 of the arrangement of FIG. 1A in which optical element 16 is rotatable about an axis corresponding to the apex 163, as indicated by the arrow R. By this expedient, the output beam C can be directed or steered through a large angle, the extent of which is in part dictated by the proximity of the lamps to the reflecting plane surfaces. This steering is accomplished with a moderate increase in cross-sectional area, and thus a moderate increase in etendue.

Figure 3B:
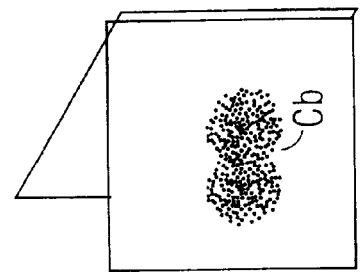
FIG. 3B is a schematic representation of the cross-section of the composite output beam of the layout of FIG. 3A.
Figure 3A:
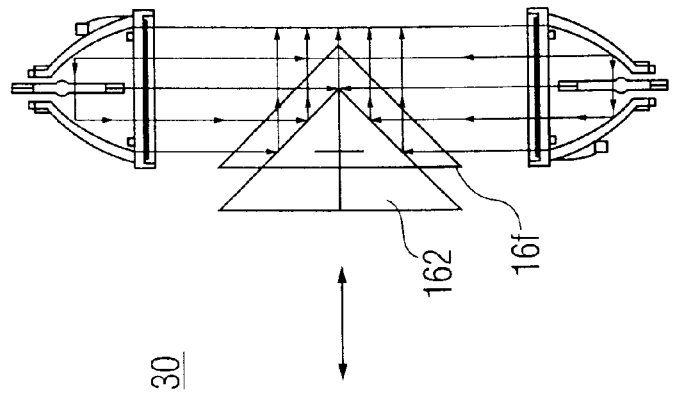
FIG. 3A is a schematic layout similar to that of FIG. 1A for another embodiment of the illumination system of the invention.

FIG. 3A shows another variation 30 of the arrangement of FIG. 1A, in which optical element 16 is movable along axis D orthogonal to axis A, and has been moved from position 16i to new position 16f further into the beam B. For example, moving the element by an amount corresponding to the diameter of the light sources (121, 141) (about ⅜ to ½ inch in the case of the UHP lamp), an increase of 20–30 percent in lumen output is obtainable. As the element 16 is advanced further into the beam B, the cross-section Cb of beam C (FIG. 3B) is increasingly broadened. While the broadened cross-section increases the etendue of the beam, the position of element 16 can be adjusted to result in an optimum tradeoff between increased lumen output and reduced etendue for a particular projection system. For example, the degree of broadening of the cross-section Cb can be set to fill an optical aperture having a wide aspect ratio.

Figure 4:
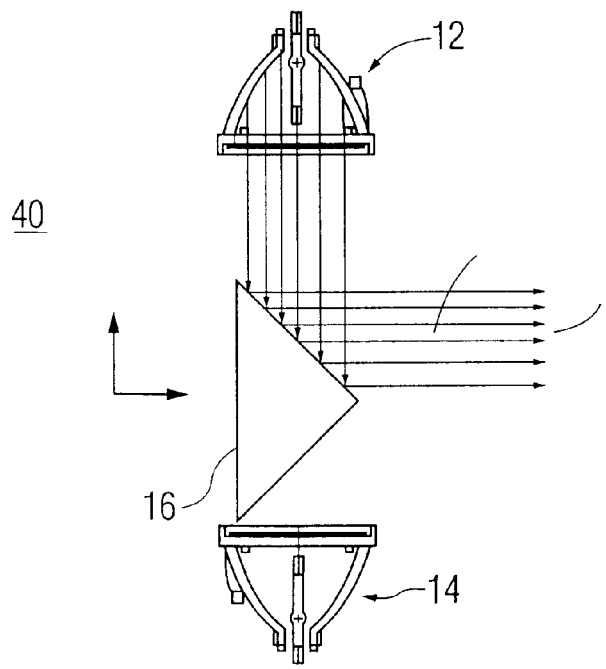
FIG. 4 is is a schematic layout similar to that of FIG. 1A for yet another embodiment of the illumination system of the invention.

FIG. 4 shows yet another variation 40 of the arrangement of FIG. 1A, in which the optical element 16 is movable along both the A and D axes, and has been moved along both of these axes to a position in which the entire beam of lamp 12 is reflected along axis D to form output beam E. This arrangement enables continued operation of the illumination system in the event that lamp 14 fails and there is no replacement available. If the lamps had been operating at less than full power, for example, in order to lengthen their operating life, the remaining lamp can then be operated full power until the failed lamp is replaced.

Figure 5:
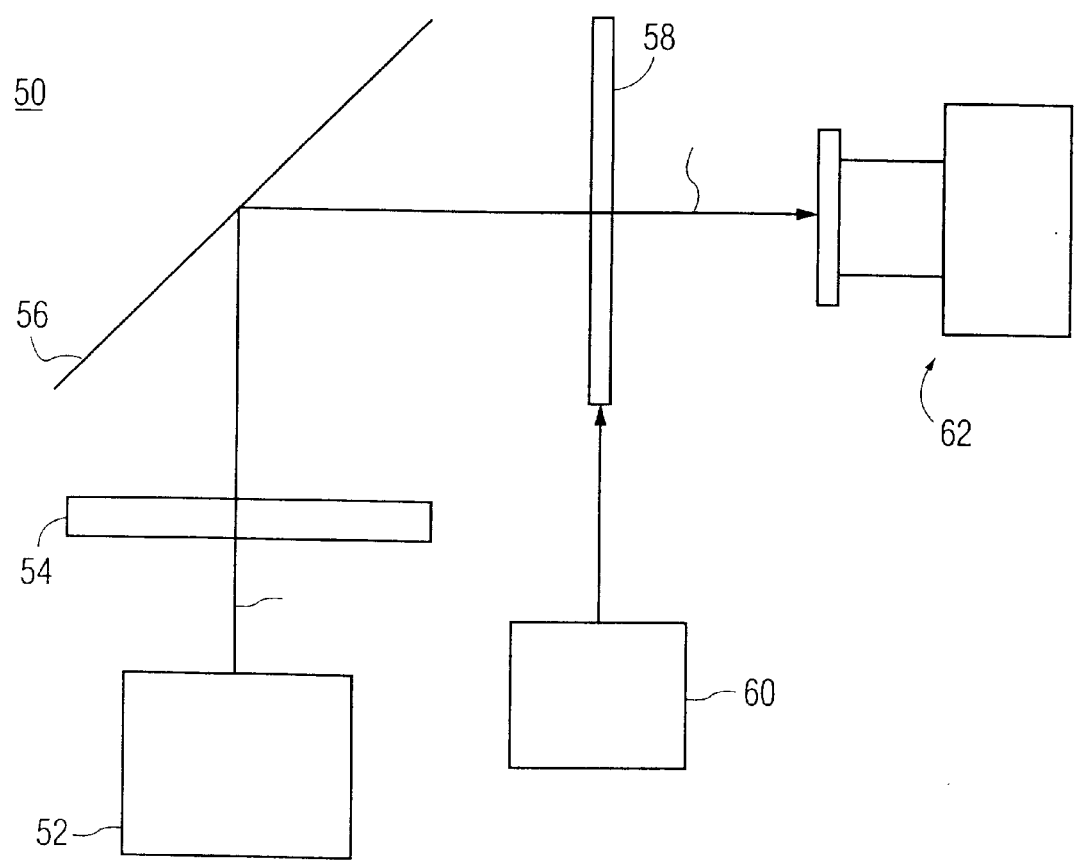
FIG. 5 is a schematic layout of a projection display system employing the dual lamp illumination system of the invention.

FIG. 5, a schematic layout of a projection display system 50, including a dual lamp illumination system 52 similar to that of FIG. 1A, having an outbeam C, which beam C is integrated by integrator 54, reflected by mirror 56, modulated by light-modulating display panel 58, in accordance with display information provided by signal input source 60. The modulated beam M is projected onto a display surface (not shown) by a projection lens. Integrator 54 is particularly useful in redistributing the rays of the output beam after one of the lamps in the illumination system fails and there is no provision for moving the plane mirror surfaces in the manner shown in FIG. 4 to reflect the entire beam of the remaining lamp into the path of the output beam.

While the invention has been described in terms of a limited number of embodiments, it will be appreciated that other embodiments and variations will become apparent from the description and figures provided herein, and such other embodiments and variations are intended to be encompassed within the scope of the appended claims.

Thus, while the illumination system of the invention has been shown in a projection display system, many other uses for the illumination system will become apparent to those skilled in the art. For example, direct view display systems, and direct illumination systems in which the etendue of the output beam is important.

Moreover, many other projection systems are known in which the illumination system of the invention would be useful. For example, the output beam could be divided into primary color components, and each component modulated in accordance with separate information display signals, such as the primary color components of a color video signal, after which the separately modulated components are recombined to form a full color image before being projected onto a display surface. The separate modulation can take place on three separate light modulating display panels, or on a single panel, either in a frame-sequential manner, or by means of scrolling color bands, all as known in the art. Suitable scrolling color projections are shown, for example, in U.S. Pat. Nos. 5,532,763 and 5,548,347, incorporated herein by reference.

What is claimed is:

1. A dual lamp illuminating system comprising:
   a first lamp and a second lamp, each lamp comprising a light source and a collimating reflector for forming a collimated illumination beam, the lamps being positioned with respect to one another so that the beam of the first lamp is directed into the reflector of the second lamp, and the beam of the second lamp is directed into the reflector of the first lamp, in a manner so that the beams at least partially overlap to form a first composite beam;
   first and second plane mirror surfaces oriented adjacent to one another and positioned so as to each reflect a portion of the first composite beam in a different but common direction along a common axis, to form a second composite beam.

2. The dual lamp illumination system of claim 1 in which the beams of the first and second lamps have approximately the same cross-sectional area.

3. The dual lamp illumination system of claim 1 in which the lamps are positioned so that the first and second beams in the region of the composite beam have a common axis.

4. The dual lamp illumination system of claim 1 in which the lamps are positioned to face each other along a common axis.

5. The dual lamp illumination system of claim 1 in which the plane mirror surfaces are mutually perpendicular and meet along a common edge corresponding to the line of intersection of geometric planes corresponding to the plane mirror surfaces.

6. The dual lamp illumination system of claim 1 in which the plane mirror surfaces are mutually perpendicular and meet along a common edge corresponding to the line of intersection of geometric planes corresponding to the plane mirror surfaces.

7. The dual lamp illumination system of claim 6 in which the plane mirror surfaces are positioned so that the common edge is proximate to, as well as perpendicular to, the common axis of the beams.

8. The dual lamp illumination system of claim 1 in which the plane mirror surfaces are rotatable about an axis of rotation corresponding to the common edge.

9. The dual lamp illumination system of claim 5 in which the plane mirror surfaces comprise the reflecting surfaces of two adjacent sides of at least a portion of a cube.

10. The dual lamp illumination system of claim 1 in which the plane mirror surfaces are moveable along an axis orthogonal to the axis of the first combined beam.

11. The dual lamp illumination system of claim 10 in which the plane mirror surfaces are moveable along the axis of the first combined beam.

12. The dual lamp illumination system of claim 7 in which the common edge is located on the common axis of the combined beams.

13. The dual lamp illumination system of claim 7 in which the common edge is located beyond the common axis of the first combined beam in the direction of the new combined beam by an amount of up to 4 times the diameter of the first light source.

14. The dual lamp illumination system of claim 13 in which the common edge is located beyond the common axis of the first combined beam in the direction of the new combined beam by an amount of from ½ to 2 times the diameter of the first light source.

15. A projection display system comprising at least one light modulating display panel, an illumination system for illuminating the display panel, and a projection lens for projecting the modulated light onto a display surface, characterized in that the illumination system comprises the dual lamp illumination system of claim 1.

16. The projection display system of claim 15 in which an optical integrator is located in the path of an exit beam from the illumination system.

17. The dual lamp illumination system of claim 1 wherein a first portion of the collimated illumination beams of the first and second lamps reach the respective first and second plane mirror surfaces directly and are reflected to form a portion of the second composite beam and a remaining second portion of the collimated illumination beams of the first and second lamps reach the collimating reflectors of the second and first lamps, respectively, and are recirculated therebetween until they strike a plane mirror surface and are reflected along said common axis as a part of the second composite beam.

18. The dual lamp illumination system of claim 17 wherein the collimating reflectors of the first and second lamps each have a parabolic shape.

19. The dual lamp illumination system of claim 1 wherein said first and second plane mirror surfaces are positioned so that only a portion of the collimated illumination beams of the first and second lamps reach the first and second plane mirror surfaces directly.

20. The dual lamp illumination system of claim 10 wherein said first and second plane mirror surfaces are oriented with respect to one another to form an angle of 90° and are positioned half way into the first composite beam.

* * * * *